United States Patent Office 3,481,965
Patented Dec. 2, 1969

3,481,965
LITHIUM SILOXANOLATES AND LINEAR POLYSILOXANE PROCESS
Terry G. Selin, Schenectady, N.Y., assignor to General Electric Company, a corporation of New York
No Drawing. Filed Dec. 19, 1966, Ser. No. 602,519
Int. Cl. C07f 7/08, 7/18; C08g 31/09
U.S. Cl. 260—448.2
10 Claims

ABSTRACT OF THE DISCLOSURE

Process for preparing lithium siloxanolates by reacting lithium silanolates with cyclic trisiloxanes in the presence of basic solvents at relatively low temperatures, and preparing linear polysiloxanes by reacting the lithium siloxanolates with halosilanes.

---

This invention relates to a new process for the preparation of lithium siloxanolates and to a process for preparing linear polysiloxanes therefrom.

It has recently been found that sodium and potassium silanolates react readily with cyclic siloxanes, as trisiloxanes and tetrasiloxanes, to form sodium and potassium disiloxanolates. In the reaction, the cyclic ring of the cyclic siloxane reactant is cleaved, as illustrated below by the equation given for reaction of octaphenylcyclotetrasiloxane and sodium trimethylsilanolate:

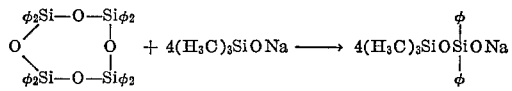

Under the conditions described in my copending application, Ser. No. 602,478, filed concurrently herewith and assigned to the same assignee as the present invention, lithium silanolates react in a similar fashion.

However, under the conditions of the present invention, it has now been found that lithium silanolates react easily with cyclic trisiloxanes in basic solvents to open the rings and produce lithium siloxanolates without significant degradation, according to the following equation:

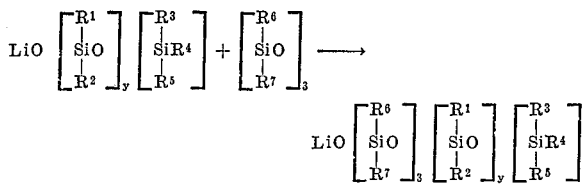

It has further been found that these lithium siloxanolates can react further with silanes having at least one silicon-bonded halogen atom to form a new siloxane unit with a lithium halide as a by-product.

It is, therefore, an object of this invention to provide a new process for the preparation of lithium siloxanolates.

Another object is to provide a process for producing linear polysiloxanes from such lithium siloxanolates.

Additional objects will be apparent from the following detailed description.

In accordance with the present invention, there is provided a process for forming lithium siloxanolates having the general formula:

(1) 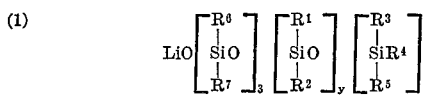

wherein $R^1$ through $R^4$, $R^6$ and $R^7$ are hydrocarbyl radicals and $R^5$ is selected from the group consisting of hydrocarbyl radicals and hydrocarbyloxy radicals, and $y$ is zero or 1. This process comprises reacting from about 1.25 to about 2.0 molar proportions of a lithium silanolate having the general formula (2) 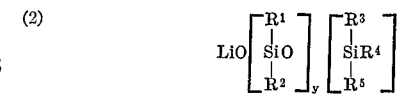

with one molar proportion of a cyclic trisiloxane having the general formula (3) 

in the presence of a basic solvent at a temperature of from about 0° C. to about 50° C.

Another embodiment of the invention constitutes a novel process for making linear polysiloxanes having the general formula (4) 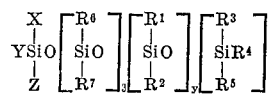

wherein $R^1$ through $R^7$ and $y$ are as previously defined and X, Y and Z are selected from hydrogen, halogen radicals, hydrocarbyl radicals, acyloxy radicals, and hydrocarbyloxy radicals. This comprises reacting a lithium siloxanolate having the general formula 1) 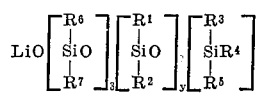

with a silane having the general formula (5) 

wherein W is halogen, and X, Y and Z are selected from hydrogen, halogen radicals, hydrocarbyl radicals, hydrocarbyloxy radicals and acyloxy radicals.

As indicated, the lithium siloxanolates are defined by general Formula 1. Hydrocarbyl groups $R^1$–$R^7$ include: alkyl—methyl, ethyl, propyl, isopropyl, butyl and octyl; olefinically unsaturated monovalent hydrocarbon radicals—vinyl, allyl, and cyclohexyl; aryl—phenyl, tolyl and naphthyl; aralkyl—benzyl and phenylethyl; cycloalkyl—cyclohexyl and cycloheptyl. Hydrocarbyloxy group $R^5$ includes: alkoxy—methoxy, ethoxy and butoxy; and cycloalkoxy—cyclohexoxy.

Typical lithium siloxanolates defined by general Formula 1 include:

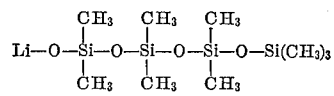

and

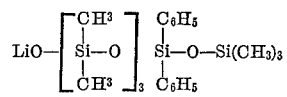

Lithium silanolates employed in preparing the lithium siloxanolates are represented by the general formula (2) 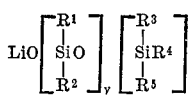

wherein $R^1$–$R^5$ and $y$ are as defined above. Since $y$ can be zero, it is obvious that a sub-genus of silanolates can be defined by the general formula (6) $$\text{LiOSiR}^4 \quad \begin{array}{c} R^3 \\ | \\ R^5 \end{array}$$

When a silanolate of general Formula 6 is used, the resulting lithium siloxanolate has the general formula (7) $$\text{LiO}\left[\begin{array}{c} R^6 \\ | \\ \text{SiO} \\ | \\ R^7 \end{array}\right]_3 \left[\begin{array}{c} R_3 \\ | \\ \text{SiR}^4 \\ | \\ R^5 \end{array}\right]$$

Representative lithium silanolates include lithium trimethylsilanolate; lithium triethylsilanolate; lithium trioctylsilanolate; lithium ethyldimethylsilanolate; lithium triphenylsilanolate; lithium methyldiphenylsilanolate; and lithium ethoxydimethylsilanolate.

Cyclic trisiloxanes employed in the reaction with lithium silanolates are defined by the general formula (3) $$\left[\begin{array}{c} R^6 \\ | \\ \text{SiO} \\ | \\ R^7 \end{array}\right]_3$$

wherein $R^6$ and $R^7$ are as defined above. Typical cyclic trisiloxanes include those in which the combination of $R^6$ and $R^7$ is: hexamethyl; hexaethyl; hexaoctyl, trimethyltriethyl; hexaphenyl; and trimethyltriphenyl.

In preparing the lithium siloxanolates of general Formula 1, from about 1.25 to about 2.0 molar proportions of lithium silanolate of Formula 2 are reacted with one molar proportion of cyclic trisiloxane of Formula 3. It is essential to employ an excess, such as the above excess, of the lithium silanolate to insure that all of the cyclic trisiloxane is reacted and to insure that the product does not polymerize to a high molecular weight, but instead comprises a mixture of the siloxanolate of Formula 1 with the starting lithium silanolate of Formula 2.

To increase the stability of the lithium siloxanolate of Formula 1, the reaction is generally effected at a temperature as low as convenient. Temperatures near 0° C. are desirable and a suitable reaction temperature range is from about 0° C. up to about room temperature, e.g., a temperature of about 25° C.

The time allowed for the reaction is the minimum time necessary to complete the reaciton, which time is a function of temperature, but which is of the order of from 0.25 to 4 hours. As will be described further hereinafter, the reaction mixture is reacted with the silane of Formula 5 as soon as possible after formation of the lithium siloxanolate of Formula 1.

The basic solvents employed in conducting the reaction between the lithium silanolate and the cyclic trisiloxane are weakly basic aprotic solvents having an unshared pair of electrons in the molecule and which are inert to the reactants under the conditions of the reaction. These solvents are generally employed in an amount equal to from about 2 to 50 parts by weight solvent per part of the other components of the reaction mixture. Typical solvents for the reaction include tertiary amines, such as triethylamine, tripropylamine, tributylamine, dimethylaniline, diethylaniline, pyridine, and the picolines. Other solvents include: amides—dimethylformamide; sulfur compounds—dimethylsulfoxide; and cyclic ethers—tetrahydrofuran and tetrahydropyran. Of such solvents, tetrahydrofuran is particularly preferred.

The reaction of the silanolate and the cyclic trisoloxane is effected by dissolving the silanolate in the solvent, slowly adding the cyclic trisiloxane to the reaction mixture, and then stirring the reaction mixture until the reaction is completed.

As mentioned earlier, it is desirable to react the lithium siloxanolate of Formula 1 as soon as it is formed. A determination can be made of the progress of the reaction between the lithium silanolate and the cyclic trisiloxane by following the reaction on infrared and observing the disappearance of the cyclotrisiloxane band or by vapor phase chromatography techniques. Once all of the cyclic trisiloxane is reacted, a competing reaction can take place at a significant rate between the excess lithium silanolate and the lithium siloxanolate product. To avoid this competing and undesirable reaction to take place, as soon as the first reaction is completed, the second reaction, which is the reaction between the lithium siloxanolate of Formula 1 and the silane of Formula 5 is begun.

The lithium siloxanolates of general Formula 1 provide a means for forming linear polysiloxanes of general Formula 4, particularly polysiloxanes having unlike terminal groups at the end of the linear chain. Reacted with the lithium siloxanolates for this purpose are silanes having the general formula (5) $$\begin{array}{c} X \\ | \\ \text{YSiW} \\ | \\ Z \end{array}$$

wherein W, X, Y and Z are as defined above. Typical silanes include: silicon tetrachloride; trimethylchlorosilane; ethyltrichlorosilane; dimethylchlorosilane; methyldiacetoxychlorosilane; phenyldimethylchlorosilane; dimethylpropylchlorosilane; and methyldiethoxychlorosilane.

It will be apparent that reaction of silane (5) with lithium siloxanolate (1) provides a linear polysiloxane (4). And when a lithium siloxanolate (7) is employed, the resulting linear polysiloxane has the general formula (8) $$\begin{array}{c} X \\ | \\ \text{YSiO} \\ | \\ Z \end{array}\left[\begin{array}{c} R^6 \\ | \\ \text{SiO} \\ | \\ R^7 \end{array}\right]_3\left[\begin{array}{c} R^3 \\ | \\ \text{SiR}^4 \\ | \\ R^5 \end{array}\right]$$

To effect the reaction between the lithium siloxanolate of Formula 1 and the silane of Formula 5, the silane of Formula 5 is used in the pure state or is dissolved in the same type of solvent employed in the first stage of the reaction. Alternatively, other unreactive solvents can also be used. Such other solvents include hexane, octane, cyclohexane, Tetralin, benzene, toluene, and diphenyl. Where solvent is used for the silane, it is used in an amount equal to about 1 to 10 parts by weight of solvent, based on the weight of the silane. The solution of the lithium siloxanolate containing unreacted lithium silanolate is then slowly added to the solution of the silane of Formula 5. A convenient temperature for effecting this reaction is a temperature approximating room temperature, e.g., from about 20 to 40° C. The proportions of the two solutions employed are selected so that the silane of Formula 5 is present in an amount equal to one molar proportion per molar proportion of lithium atoms in both the lithium siloxanolate of Formula I and the excess lithium silanolate of Formula 2. Preferably, the silane is present in about 10–150 percent excess. Generally, the addition is completed in a few minutes up to a several hours period and, since the reaction between the silane of Formula 2 and the silanolate is substantially instantaneous, the reaction is completed at the time the addition is completed. The desired products of the present invention are prepared by filtering the lithium salt precipitates from the reaction mixture and fractionally distilling the resulting materials and isolating the desired linear siloxanes of Formula 4.

The invention is illustrated by the following non-limiting examples. All parts are by weight unless indicated otherwise.

EXAMPLE 1

Lithium nonamethyltetrasiloxane-1-olate was prepared from lithium trimethylsilonate and hexamethylcyclotrisiloxane according to the following equation and description:

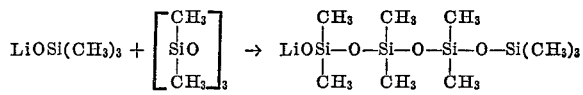

A small 3-necked flask was equipped with a thermometer, reflux condenser, and magnetic stirrer. After flushing the system with dry nitrogen, the flask was charged with 9.6 g. (0.1 mole) of sublimed LiOSi(CH$_3$)$_3$ and 75 ml. of dry tetrahydrofuran (THF). The resulting solution was maintained at 24° C. by means of an external water bath. With constant stirring, 11.1 g. (0.05 mole) of hexamethylcyclotrisiloxane was added as a single portion. The solution temperature immediately dropped several degrees but the constant temperature bath quickly returned the temperature to 24° C.

In order (a) to identify the products of the above reaction, (b) to illustrate the change in the reaction mixture with time, and (c) to show the second portion of the process of this invention, periodically, 5 ml. samples of clear, colorless reaction mixture were withdrawn by means of a syringe. Each sample thus obtained was added to about 50 percent excess methyldiphenylchlorosilane (1.3 g.) for the purpose of characterizing the silanolates present in the reaction mixture. Vapor phase chromatographic analysis, with 1-chloronaphthalene as an internal standard, then determined the amount and types of products present. The following table summarizes the analysis of samples obtained over an eight hour period of time.

TABLE

| Total Reaction Time | Percent of Total VPC Peak Areas [1] | | | | | |
|---|---|---|---|---|---|---|
| | MDM''[2] | MD$_2$M'' | MD$_3$M'' | MD$_4$M'' | MD$_5$M'' | MD$_6$M'' |
| 5 min | 3.6 | 1.4 | 92.2 | 0.3 | | 2.5 |
| 15 min | 1.6 | 0.7 | 93.5 | 0.2 | | 4.0 |
| 30 min | 1.9 | 1.1 | 92.8 | 0.3 | | 3.9 |
| 1 hr | 2.4 | 2.3 | 90.0 | 0.5 | | 4.8 |
| 2 hrs | 2.9 | 3.1 | 89.0 | 0.9 | | 4.1 |
| 4 hrs | 4.3 | 5.1 | 84.5 | 1.6 | 0.4 | 4.1 |
| 8 hrs | 10.7 | 15.1 | 65.7 | 4.2 | 1.1 | 3.4 |

[1] Excluding unreacted hexamethylcyclotrisiloxane.
[2] Where M=(CH$_3$)$_3$SiO$_{1/2}$.
D=(CH$_3$)$_2$SiO.
M''=(C$_6$H$_5$)$_2$(CH$_3$)SiO$_{1/2}$.

Methyldiphenylchlorosilane was chosen to react with the silanolates formed because the three types of possible products which might be generated (i.e. MD$_x$M, MD$_x$M'' and M''D$_x$M'') would have widely differing boiling points and would be readily distinguishable by gas chromatography. Indeed, such was the case. In the above example, products of MD$_x$M and M''D$_x$M'' type did not even begin to appear until after the eight hour sample. As shown by the table, the amount of the desired product, MD$_3$M'', reached a peak at about 15 minutes and thereafter began to decline, with the rate of decline becoming quite rapid after about two hours.

EXAMPLE 2

When Example 1 was repeated, except that the entire lithium siloxanolate reaction product was added after 15 minutes to a 50 percent excess of methyldiphenylchlorosilane and the reaction mixture was filtered and fractionally distilled 30 minutes thereafter, a 90 percent yield of MD$_3$M'' was obtained. This product corresponds to Formula 4 when y is zero, R$^3$ to R$^7$ and Y are methyl, and X and Z are phenyl.

Lithium nonamethyltetrasiloxan-1-olate prepared as above has been reacted with other chlorosilanes to form products in high yields which otherwise would be almost inaccessible. The following example is illustrative.

EXAMPLE 3

1,1-dichloro-1-ethyl-3,3,5,5,7,7,9,9,9-nonamethylpentasiloxane was prepared by first forming lithium nonamethyltetrasiloxan-1-olate according to the equation shown in Example 1, and then reacting said lithium siloxanolate with ethyltrichlorosilane according to the following equation:

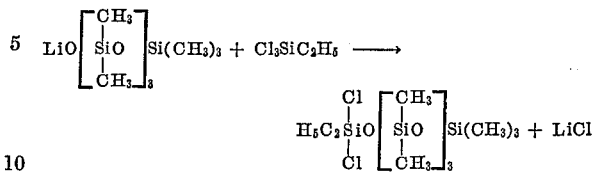

A 2 l., 3-necked flask was fitted with mechanical stirrer, thermometer, and reflux condenser. After flushing the system with N$_2$, the flask was charged with 96 g. (1 mole) of sublimed LiOSi(CH$_3$)$_3$ and 700 ml. of dry THF. The temperature of the solution was adjusted to 25° C., then 166.5 g. (0.75 mole) of hexamethylcyclotrisiloxane was added as a single portion. The resulting clear, colorless silanolate solution was stirred at 25° C. for 15 minutes, then quickly transferred to an addition funnel.

The silanolate solution was then added dropwise (over 15 minutes) with stirring and cooling to 409 g. (2.5 moles) of C$_2$H$_5$SiCl$_3$ in 400 ml. of hexane. Following the addition, the mixture was stirred for an additional 15 minutes, then filtered to remove the LiCl which had formed. Fractional distillation yielded 214 g. of (C$_2$H$_5$)Cl$_2$SiOSi(CH$_3$)$_2$OSi(CH$_3$)$_2$OSi(CH$_3$)$_2$OSi(CH$_3$)$_3$ boiling at 86° C./0.6 mm. Hg. Based on the cyclic trimer used, this represents a 70 percent yield.

EXAMPLE 4

Another batch of the lithium siloxanolate of Example 1 was prepared from 0.5 mole of lithium trimethylsilanolate and 0.35 mole of hexamethylcyclotrisiloxane. Without delay, the lithium siloxanolate solution was transferred to an addition funnel and added dropwise (over 20 minutes) with stirring and cooling to 0.75 mole of methyltrichlorosilane in 100 ml. of dry hexane. Following the addition, the reaction mixture was filtered to remove lithium chloride which had formed. Fractional distillation of the filtrate yielded 129 g. (0.304 mole) of (CH$_3$)Cl$_2$SiOSi(CH$_3$)$_2$OSi(CH$_3$)$_2$OSi(CH$_3$)$_2$OSi(CH$_3$)$_3$ boiling at 109–110° C./7 mm. Hg. Based on the cyclic trimer used, this represents a yield of 87 percent.

EXAMPLE 5

Yet another batch of the lithium siloxanolate of Example 1 was prepared from 0.25 mole of lithium trimethylsilanolate and 0.2 mole of hexamethylcyclotrisiloxane using 100 ml. of tetrahydrofuran as solvent. The siloxanolate solution was then added dropwise with stirring to a solution of 0.3 mole of dimethylchlorosilane in 75 ml. of hexane. The resulting mixture was filtered to remove lithium chloride and the resulting filtrate fractionally distilled to yield 75.3 of H(CH$_3$)$_2$SiOSi(CH$_3$)$_2$OSi(CH$_3$)$_2$OSi(CH$_3$)$_2$OSi(CH$_3$)$_3$ boiling at 110–113° C./21 mm. Hg. This corresponds to a yield of 83 percent based on the quantity of cyclic trimer used.

I claim:
1. The process for the preparation of a lithium siloxanolate having the general formula

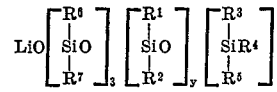

wherein R$^1$ through R$^4$, R$^6$ and R$^7$ are hydrocarbyl radicals and R$^5$ is selected from the group consisting of hydrocarbyl radicals and hydrocarbyloxy radicals, and y is zero or 1, which comprises reacting from about 1.25 to about 2.0 molar proportions of a lithium silanolate having the general formula

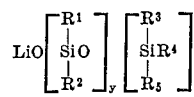

with one molar proportion of a cyclic trisiloxane having the general formula

in the presence of a basic solvent at a temperature of from about 0° C. to about 50° C.

2. The process of claim 1 wherein the solvent is tetrahydrofuran a tertiary amine dimethyl sulfoxide or dimethyl formamide.

3. The process of claim 1 wherein the lithium silanolate has the general formula (5)

and the lithium siloxanolate has the general formula (7)

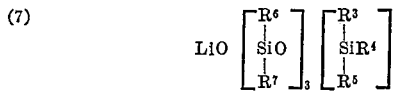

4. The process of claim 1 wherein the cyclic trisiloxane has the general formula

5. The process of claim 4 wherein the cyclic trisiloxane is

6. The process of claim 1 wherein lithium trimethylsilanolate is so reacted with hexamethylcyclotrisiloxane in the presence of tetrahydrofuran to form lithium nonamethyltetrasiloxan-1-olate.

7. The process for the preparation of a linear polysiloxane having the general formula (4)

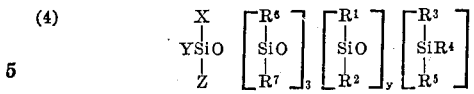

where $R^1$ through $R^4$, $R^6$ and $R^7$ are hydrocarbyl radicals and $R^5$ is selected from hydrocarbyl radicals and hydrocarbyloxy radicals, X, Y and Z are selected from hydrogen, halogen radicals, hydrocarbyl radicals, acyloxy radicals, and hydrocarbyloxy radicals, and $y$ is zero or 1, which comprises reacting a lithium siloxanolate having the general formula (1)

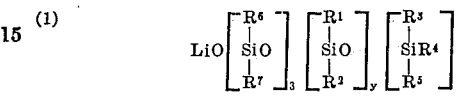

with a silane having the general formula (5)

wherein W is halogen and X, Y and Z are selected from hydrogen, halogen radicals, hydrocarbyl radicals, hydrocarbyloxy radicals, and acyloxy radicals.

8. The process of claim 7 wherein the terminal groups

are unlike.

9. The process of claim 7 wherein the silane is a chlorosilane.

10. The process of claim 7 wherein lithium nonamethyltetrasiloxan-1-olate is so reacted with trichloroethylsilane to form 1,1-dichloro-1-ethyl-3,3,5,5,7,7,9,9,9-nonamethylpentasiloxane.

References Cited

UNITED STATES PATENTS 3,337,497   8/1967   Bostick _____ 260—448.2 X

TOBIAS E. LEVOW, Primary Examiner

P. F. SHAVER, Assistant Examiner

U.S. Cl. X.R.

260—46.5, 448.8